United States Patent
Asmundson et al.

[11] Patent Number: 6,053,545
[45] Date of Patent: Apr. 25, 2000

[54] TOP ENDGATE LATCH ASSEMBLY

[75] Inventors: Kevin D. Asmundson; Lowell S. Boe, both of Rugby, N. Dak.

[73] Assignee: Rugby Manufacturing Company, N. Dak.

[21] Appl. No.: 08/778,390

[22] Filed: Dec. 31, 1996

[51] Int. Cl.[7] .............................. E05C 3/04; B62D 25/00
[52] U.S. Cl. .................. 292/210; 292/205; 292/341.17; 292/DIG. 29; 296/51
[58] Field of Search ....................... 292/DIG. 29, 341.17, 292/202, 205, 207, 210; 296/57.1, 51, 56

[56] References Cited

U.S. PATENT DOCUMENTS

| | | | |
|---|---|---|---|
| 1,720,429 | 7/1929 | Nein | 296/51 |
| 2,496,944 | 2/1950 | James | 292/DIG. 29 |
| 3,023,451 | 3/1962 | Thoel | 292/DIG. 29 |
| 3,802,726 | 4/1974 | Galbreath | 292/DIG. 29 |
| 4,141,582 | 2/1979 | Streeter . | |
| 4,358,150 | 11/1982 | Nash . | |
| 4,535,265 | 8/1985 | Mader . | |
| 4,691,956 | 9/1987 | Hodge . | |
| 4,826,237 | 5/1989 | Socha . | |
| 5,324,092 | 6/1994 | Burg . | |

FOREIGN PATENT DOCUMENTS 2754938  6/1979  Germany ...................... 292/DIG. 29

OTHER PUBLICATIONS

Photos showing top endgate pivot arrangments typical of the prior art.
Crysteel Mfg. brochure entitled "2 yd & 3yd Tipper", Crysteel Mfg. Inc. copyright 1995.

*Primary Examiner*—Flemming Saether
*Attorney, Agent, or Firm*—John W. Bunch

[57] ABSTRACT

A latch assembly (40) for the top of a pivotal endgate of a dump body includes a pivotal locking lug (48) actuated by a handle (52) which can be positively secured in a closed position. A second embodiment (60) is also disclosed.

16 Claims, 2 Drawing Sheets

TOP ENDGATE LATCH ASSEMBLY

TECHNICAL FIELD

The present invention relates generally to releasable locking devices. More particularly, this invention pertains to a latch arrangement for the top of the endgate of a dump truck to facilitate opening from either the top or the bottom.

BACKGROUND ART

Dump trucks are commonly used to haul bulk materials such as aggregate, sand, gravel, dirt and the like. A pivotal dump body is located behind the cab for operation by a hoist between a down or level position for loading and travel, and a raised or tilted position wherein the load can be unloaded by dumping out the rear endgate.

Such endgates are typically connected to the dump bodies by top pivots and secured by bottom latches, which the driver can operate from the cab to either lock or release the endgate as desired. The top pivots are usually fixed so that the endgate can only open from the bottom, which in turn results in the load being dumped directly behind the truck.

The top pivot pins of some endgates are removable. This allows the endgate to be opened from the top, about the bottom latch, so that the load can be dumped further behind the truck. This can be very useful when, for example, it is not possible to back the truck up to the place where the load is to be used.

However, while such removable top pivot pins have been used heretofore, they have presented certain difficulties. The pins can easily become lost. They can bind and become difficult to remove and/or replace, particularly if there are torsional forces between the endgate and body—which there often are when several cubic yards of construction aggregate are being carried. Since the top pivots are located at the upper corners of the endgate, such forces can cause misalignment when the body is sprung or when the truck is not on level ground while dumping its load.

A need has thus arisen for a new and improved latch assembly which provides for the convenient, safe and secure latching of the tops of such endgates.

SUMMARY OF INVENTION

The present invention comprises a latch assembly that overcomes the foregoing and other difficulties associated with the prior art. In accordance with the invention there is provided a top endgate latch assembly for use with the bodies of dump trucks. The latch assembly herein includes a pivotal jaw for selectively latching the associated pivot pin. The jaw is actuated by a pivotal handle carried thereon, which itself can be positively secured in closed and locked position.

BRIEF DESCRIPTION OF DRAWING

A better understanding of the invention can be had by reference to the following Detailed Description in conjunction with the accompanying Drawing, wherein.

DETAILED DESCRIPTION

Figure 1:
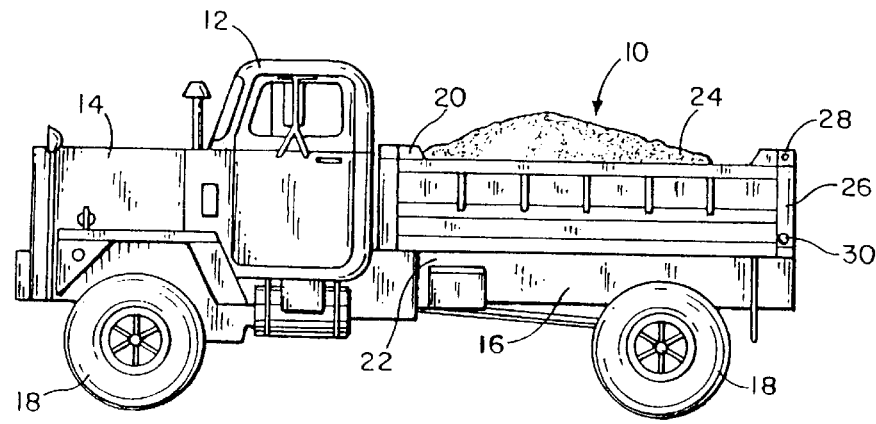
FIG. 1 is a side view of a dump truck incorporating the top endgate latch assembly of the invention.

Referring now to the Drawing, wherein like reference numerals designate like or corresponding elements throughout the views, and particularly referring to FIG. 1, there is shown a dump truck 10 of the type with which the present invention is useful. The dump truck 10 includes an operator's cab 12, engine compartment 14, chassis 16, wheels 18 and a pivotal dump body 20. The body 20 is pivotally secured to the chassis 16 behind the cab 12. A hoist 22 is provided on the chassis 16 beneath body 20 for actuating it between a down and level postion as shown, and a raised and tilted position so that the materials 24 therein can be discharged out the rear door or endgate 26 behind the truck 10.

The endgate 26 is connected to body 20 by opposing pairs of laterally spaced apart top pivots 28 and bottom pivots 30 which define upper and lower hinge axes for opening the endgate. As will be explained more fully hereinafter, a unique latch arrangement is provided so that the endgate 26 can be opened from either the top or the bottom more positively, safely and conveniently.

Although the invention herein has been illustrated and described for use with dump trucks, it will be understood that the invention can be used with virtually any type of endgate having both top and bottom pivots. For example, the top endgate latch assembly herein could also be used on agricultural and industrial vehicles, utility vehicles and carts, etc.

Opening of the endgate 26 about the axis defined by the top pivots 28 is controlled by a bottom latch assembly 32, which may be of any suitable construction. This permits the bottom of the endgate 26 to be opened in the usual fashion to dump materials 24 from body 20 directly behind the truck 10. For example, the bottom latch assembly 32 can be constructed like that shown in U.S. Pat. No. 4,826,237 to Rugby Manufacturing Company, the assignee hereof. The entire disclosure of U.S. Pat. No. 4,826,237 is incorporated herein by reference.

Figures 2, 3:
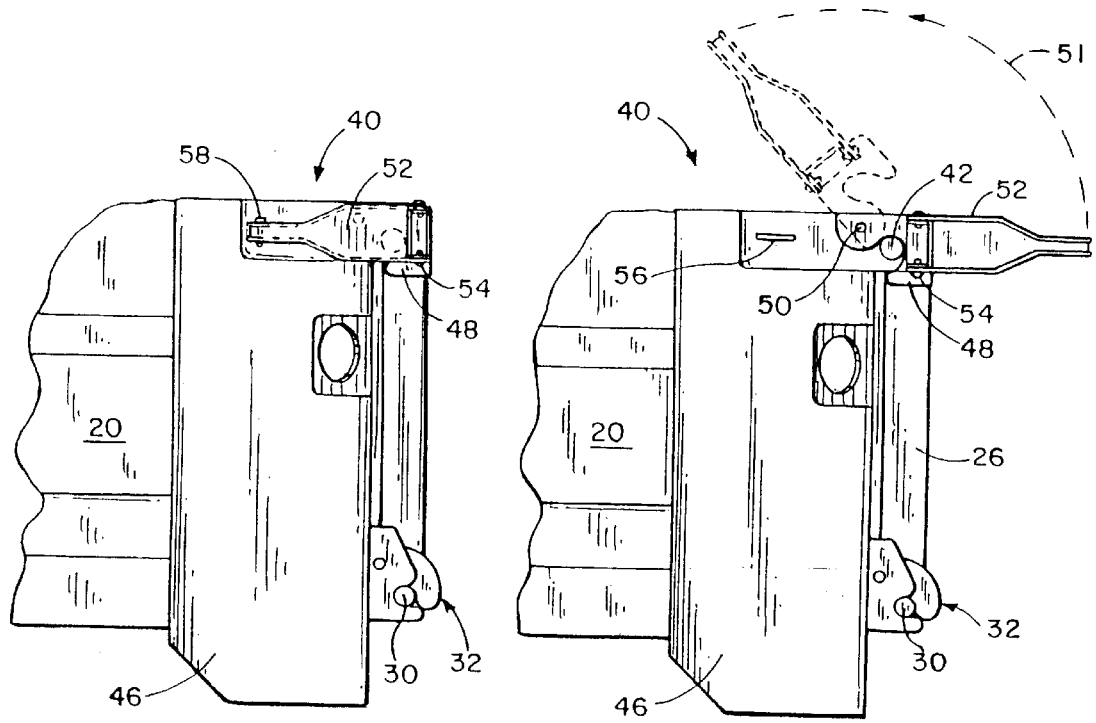
FIG. 2 is an enlarged partial side view of a latch assembly incorporating a first embodiment of the invention, shown in closed position.
FIG. 3 is a view similar to FIG. 2, but showing the latch assembly partially opened.
Figure 4:
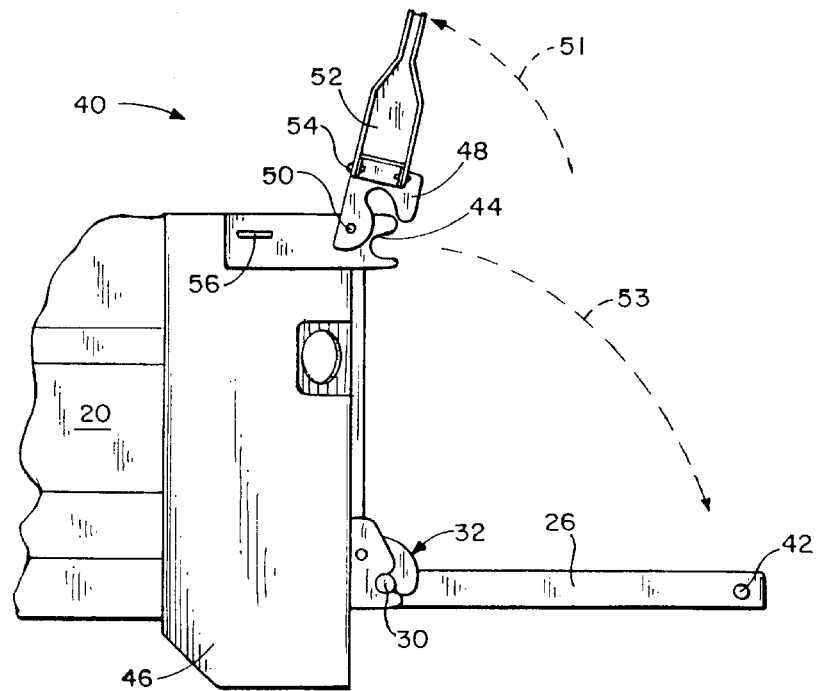
FIG. 4 is a view similar to FIG. 2, but showing the latch assembly and the endgate fully opened.

The present invention comprises the top latch assembly 40, the constructional details of which are shown in FIGS. 2–4. One top latch assembly 40 is provided at each upper corner of the endgate 26, in association with the respective top pivot 28.

In the top latch assembly 40 of the first embodiment, the top pivot 28 consists of oppositely extending pivot shafts or pins 42 fixed on the endgate 26. The pins 42 are adapted for receipt by notches 44 in the upright end posts 46 of body 20, as best seen in FIG. 4. The pins 42 are selectively secured and captured in the notches 44 by a slotted locking lug or jaw 48, which is movable between open and closed positions. In the preferred construction of the invention, the jaw 48 is carried on and connected to the post 46 by for movement in a generally vertical plane about a horizontal pivot 50 as indicated by arrow 51. When each jaw 48 is in the open position, pins 42 are free to move away from notches 44 so that the endgate 26 can be opened from the top as indicated by arrow 53 in FIG. 4. Chains (not shown) are typically used to limit downward movement of the endgate 26.

The latch assembly 40 includes means for positively securing the jaw 48 in the closed position. In the preferred construction, a handle 52 is carried on and connected to each jaw 48 by pivot 54. Holes are provided in the end of handle 52 for alignment with an opening in a lug 56 on the post 46 so that when the jaw 48 is closed, the handle can also be closed and locked shut with a removable safety pin 58, as best seen in FIG. 2.

In order to release the top of the endgate 20 for pivotal movement about the lower pivots 30, safety pin 58 is first removed so that handle 52 can be swung open and used to open jaw 48. The handle 52 provides the leverage necessary to close jaw 48 and easily secure the top pivot pins 42, even if there is some relative misalignment between the body 20 and endgate 26. The handle 52 cannot be closed unless jaw 48 is closed, and when the handle is closed and secured with the safety pin 58, the endgate 26 cannot be opened from the top.

If desired, the handle 52 and/or safety pin 58 could be secured with a padlock (not shown) for additional security, against tampering for instance.

Figure 5:
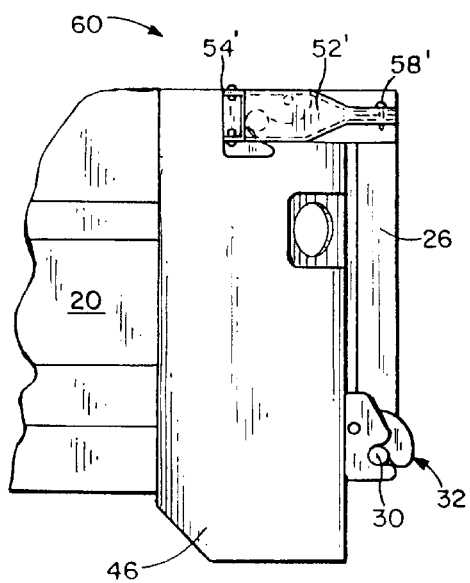
FIG. 5 is an enlarged partial side view of a latch assembly incorporating a second embodiment of the invention, shown in closed position.
Figure 6:
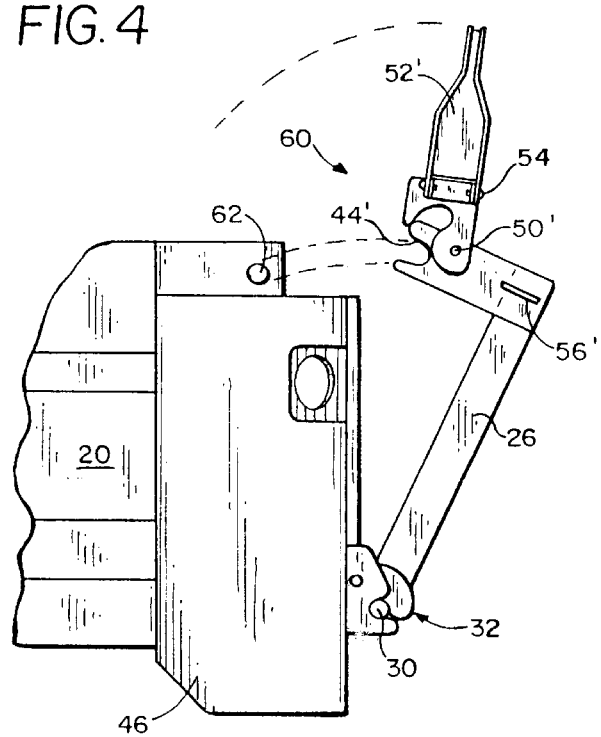
FIG. 6 is a view similar to FIG. 5, but showing the latch assembly and endgate partially opened.

FIGS. 5 and 6 show a top endgate latch assembly 60 incorporating a second embodiment of the invention. Since latch assembly 60 utilizes numerous components that are similar to those of latch assembly 40 of the first embodiment, they have been identified with the same reference numerals, but with prime (') notations for differentiation.

The primary difference between the embodiments is that pivot shafts or pins 62 comprising the top pivots 28 are carried on and connected to the end posts 46 of the body 20, instead of the endgate 26 as in the first embodiment. Similarly, the notch 44', locking lug or jaw 48' and so forth are carried on the endgate 26, rather than the body 20. Otherwise, the latch assemblies 40 and 60 operate similarly.

From the foregoing, it will thus be understood that the present invention comprises a new and unique top endgate latch assembly having several advantages over the prior art. One significant advantage is that the latch assembly herein is safe and convenient to use, even if there is some relative misalignment between the body and endgate. The top endgate latch assembly can be positively secured and locked. Other advantages will be evident to those skilled in the art.

Although particular embodiments of the invention have been illustrated in the accompanying Drawing and described in the foregoing Detailed Description, it will be understood that the invention is not limited only to the embodiments disclosed, but is intended to embrace any equivalents, modifications and/or rearrangements of elements falling within the scope of the invention as defined by the following claims.

What is claimed is:

1. A latch assembly for an endgate on the body of a vehicle, the endgate having a top end, a bottom end and opposite sides, which latch assembly comprises:

a pair of laterally spaced-apart, generally coaxial pivot pins defining a top pivot axis;

means including an associated pivotal latch for selectively interconnecting each pivot pin with the endgate and body, said latch being movable between latched and unlatched positions;

an associated handle pivotally secured to each latch for manual actuation thereof, said handle being movable between an open position and a closed position overlying said latch; and means for selectively securing each handle in the closed position.

2. The latch assembly of claim 1, wherein the top pivot axis defined by said pivot pins is generally horizontal.

3. The latch assembly of claim 1, wherein said pivot pins are adapted to be mounted on the body and each latch is adapted to be mounted on the endgate.

4. The latch assembly of claim 1, wherein said pivot pins are adapted to be mounted on the endgate and each latch is adapted to be mounted on the body.

5. The latch of claim 1, wherein said means for selectively securing each handle of said latch means comprises a removable locking pin and associated keeper.

6. The latch assembly of claim 1, further including:

a pair of laterally spaced-apart, generally coaxial second pivot pins defining a bottom pivot axis; and means for selectively interconnecting each second pivot pin with the endgate and body whereby said endgate can be pivoted between open and closed positions about either the top axis or the bottom axis.

7. A pivot latch assembly for an endgate on the body of a vehicle, the endgate having top and bottom ends and opposite sides, which latch assembly comprises:

a pair of laterally spaced-apart, generally coaxial first pivot pins defining a first pivot axis, said pivot pins being adapted to be mounted on opposite sides of the endgate for movement therewith;

the adjacent portion of the body including a notch for receiving the associated first pivot pin therein;

an associated latch adapted to be pivotally secured to the body adjacent to each notch, said pivotal latches being movable between latched and unlatched positions with respect to said first pivot pins for selectively latching the endgate to the body;

an associated handle pivotally secured to each latch, said handle being movable between an open position for manual actuation of the associated latch and a closed position overlying said latch; and means for selectively securing each handle to the body in the closed position with the associated latch in the latched position.

8. The pivot latch assembly of claim 7, wherein said means for selectively securing each handle comprises a removable locking pin and keeper.

9. The pivot latch assembly of claim 7, wherein said first pivot pins are disposed adjacent the top end of the endgate.

10. The pivot latch assembly of claim 7, further including:

a pair of laterally spaced apart, generally coaxial second pivot pins defining a second pivot axis and in spaced apart relationship with the first pivot axis;

means for selectively interconnecting said second pivot pins with the endgate and body so that the endgate can be selectively opened about the first and second pivot axes.

11. The pivot latch assembly according to claim 10, wherein said first pivot pins are disposed adjacent the top end of the endgate, and the second pivot pins are disposed adjacent the bottom end of the endgate.

12. In combination with an endgate for a truck body, the endgate having a top end, a bottom end and opposite sides, a latch assembly comprising:

a pair of laterally spaced-apart, generally coaxial first pivot pins defining a top pivot axis;

means including an associated pivotal latch for selectively interconnecting each first pivot pin with the endgate and body, said latch being movable between latched and unlatched positions;

an associated handle pivotally secured to each latch for manual actuation thereof, said handle being movable between an open position and a closed position overlying said latch;

means for selectively securing each handle in the closed position;

a pair of laterally spaced apart, generally coaxial second pivot pins defining a bottom pivot axis; and means for selectively securing each second pivot pin and the endgate and body so that said endgate is openable about either the top or bottom pivot axes.

13. The latch assembly of claim 12, wherein the top pivot axis defined by said first pivot pins is generally horizontal.

14. The latch assembly of claim 12, wherein said first pivot pins are adapted to be mounted on the truck body and said latches are mounted on said endgate.

15. The latch assembly of claim 12, wherein said first pivot pins are mounted on said endgate and said latches are adapted to be mounted on the truck body.

16. The latch assembly of claim 12, wherein said means for selectively securing each handle comprises a removable locking pin and keeper.

* * * * *